US010785962B2

(12) United States Patent
Combs et al.

(10) Patent No.: US 10,785,962 B2
(45) Date of Patent: Sep. 29, 2020

(54) BIRD FEEDER FINIAL ASSEMBLY

(71) Applicant: Classic Brands, LLC, Denver, CO (US)

(72) Inventors: Stephen Combs, Denver, CO (US); Lynn Hunter, Parker, CO (US); Robert Donegan, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 267 days.

(21) Appl. No.: 15/914,765

(22) Filed: Mar. 7, 2018

(65) Prior Publication Data
US 2019/0274287 A1 Sep. 12, 2019

(51) Int. Cl.
| | | |
|---|---|---|
| *A01K 39/01* | (2006.01) | |
| *A01K 39/014* | (2006.01) | |
| *F16C 11/04* | (2006.01) | |
| *A01K 39/012* | (2006.01) | |

(52) U.S. Cl.
CPC .......... *A01K 39/014* (2013.01); *A01K 39/012* (2013.01); *F16C 11/04* (2013.01)

(58) Field of Classification Search
CPC .... A01K 39/01; A01K 39/012; A01K 39/014; A01K 39/0113; A01K 39/00
See application file for complete search history.

(56) References Cited

U.S. PATENT DOCUMENTS

| | | | | |
|---|---|---|---|---|
| 2,856,898 A | * | 10/1958 | Doubleday | ........ A01K 39/0113 119/57.9 |
| 6,155,205 A | * | 12/2000 | Coates | ................. A01K 39/014 119/52.3 |
| 6,341,576 B1 | * | 1/2002 | Cathell | ............... A01K 39/0113 119/52.3 |
| 6,418,878 B1 | * | 7/2002 | Cathell | ............... A01K 39/0113 119/52.3 |
| 7,287,486 B2 | | 10/2007 | Hunter | |
| 9,609,852 B2 | * | 4/2017 | Cote | ................... A01K 39/0113 |
| 2004/0118352 A1 | * | 6/2004 | Adams | ............... A01K 39/0113 119/57.9 |
| 2004/0216682 A1 | * | 11/2004 | Kuelbs | ................. A01K 39/012 119/52.2 |

(Continued)

OTHER PUBLICATIONS

2008 Droll Yankees Product Catalog. 2010-2012 More Birds Bird Feeders & Nectar Product Catalog.
2013 More Birds Bird Feeders & Nectar Product Catalog.

(Continued)

*Primary Examiner* — Monica L Barlow
(74) *Attorney, Agent, or Firm* — Polsinelli P.C.

(57) ABSTRACT

Implementations described and claimed herein provide a bird feeder finial assembly. In one implementation, a bird feeder includes a finial having a finial body. The finial has a longitudinal axis. A swivel surface is disposed on the finial body, and a neck extends distally from the finial body along the longitudinal axis. The swivel has a swivel body with a proximal surface and a distal surface. A swivel opening is defined in the swivel body. The neck extends through the swivel opening, and the swivel body is translatable along the neck. A hanger is connected to the swivel body. The swivel body translates along the neck towards the first swivel surface into a swivel position when a suspending force is applied to the hanger, and the finial freely is rotatable about the longitudinal axis independent of the hanger when the swivel body is in the swivel position.

17 Claims, 13 Drawing Sheets

(56) References Cited

U.S. PATENT DOCUMENTS

| | | | | |
|---|---|---|---|---|
| 2005/0257749 A1* | 11/2005 | Kuelbs | ............... | A01K 39/014 119/57.8 |
| 2006/0118055 A1* | 6/2006 | Kuelbs | ............... | A01K 39/014 119/57.8 |
| 2006/0272586 A1* | 12/2006 | Hunter | ............... | A01K 31/06 119/57.8 |
| 2009/0133636 A1* | 5/2009 | Richmond | ......... | A01K 39/0206 119/52.2 |
| 2011/0271910 A1* | 11/2011 | Baynard | ........... | A01K 39/0206 119/51.5 |
| 2012/0037080 A1* | 2/2012 | Hepp | ................... | A01K 29/00 119/52.3 |
| 2013/0098297 A1* | 4/2013 | Chen | ................... | A01K 39/012 119/51.01 |
| 2014/0305373 A1* | 10/2014 | Trogdon | ............ | A01K 39/012 119/51.01 |
| 2019/0098875 A1* | 4/2019 | McFerrin | .............. | A01K 39/01 |

OTHER PUBLICATIONS

2014 More Birds Bird Feeders & Nectar New Product Catalog Supplement.
2015 More Birds Bird Feeders & Nectar Product Catalog.
2016 More Birds Bird Feeders & Nectar Product Catalog.
2010 Belle Fleur Wild Bird Products Catalog.
2011 Belle Fleur Wild Bird Products Catalog.
2013 Belle Fleur Wild Bird Products Catalog.
2010 Stokes Select Bird Feeders & Accessories Products Catalog: The most complete collection of bird feeding products.
2011 Stokes Select Bird Feeders & Accessories Products Catalog: The most complete collection of bird feeding products.
2013 Stokes Select Bird Feeders & Accessories Products Catalog: The most complete collection of bird feeding products.
2014 Stokes New Products Supplemental Products Catalog.
2015 Stokes New Products Supplemental Products Catalog.
Squirrel Buster Peanut +, Pub. Date. Jan. 2007.

* cited by examiner

BIRD FEEDER FINIAL ASSEMBLY

FIELD

Aspects of the present disclosure relate generally to bird feeder suspension and more particularly to a bird feeder finial assembly providing free rotation of a feeder assembly relative to a hanger during suspension.

BACKGROUND

During use, bird feeders are often hung from a tree branch, pole, beam, hook, and/or similar hanging structure where birds may access bird food, such as seed or nectar. Many bird feeders include a hanger to hang the bird feeder from a hanging structure. However, in the presence of an application of a rotational force to the bird feeder, caused by wind, pests (e.g., squirrels), or the like, the hanger may detach from the remainder of the bird feeder, causing the bird feeder to fall or the bird food to otherwise become accessible to pests. For example, some bird feeders include a top screwed to a reservoir holding bird food, and a hanger mounted to the top. The wind or a pest, such as a squirrel, may apply a rotational force to the reservoir, resulting in the top unscrewing from the reservoir. It is with these observations in mind, among others, that various aspects of the present disclosure were conceived and developed.

SUMMARY

Implementations described and claimed herein address the foregoing problems by providing a bird feeder finial assembly. In one implementation, a bird feeder includes a feeder assembly having a top. A top opening is defined in a surface of the top. A finial has a proximal portion and a distal portion, and the finial having a longitudinal axis centered on the top opening. A first swivel surface is disposed on the proximal portion. The first swivel surface extends transverse to the longitudinal axis. A second swivel surface is disposed on the distal portion. The second swivel surface extends transverse to the longitudinal axis and faces the first swivel surface. A swivel has a swivel body translatable between the first swivel surface and the second swivel surface along the longitudinal axis. A hanger is connected to the swivel body. The swivel body translating towards the first swivel surface into a swivel position when a suspending force is applied to the hanger. The feeder assembly is freely rotatable about the longitudinal axis independent of the hanger when the swivel body is in the swivel position.

In another implementation, a bird feeder includes a finial having a finial body. The finial has a longitudinal axis. A swivel surface is disposed on the finial body, and a neck extends distally from the finial body along the longitudinal axis. The swivel has a swivel body with a proximal surface and a distal surface. A swivel opening is defined in the swivel body. The neck extends through the swivel opening, and the swivel body is translatable along the neck. A hanger is connected to the swivel body. The swivel body translates along the neck towards the swivel surface into a swivel position when a suspending force is applied to the hanger, and the finial freely is rotatable about the longitudinal axis independent of the hanger when the swivel body is in the swivel position.

In another implementation, an application of a suspending force is received on a hanger connected to a swivel. The swivel has a swivel body with a proximal surface and a distal surface. The swivel body is translated along a neck of a finial upon the application of the suspending force. The swivel body is translated towards a first swivel surface of the finial into a swivel position. The finial is connected to a feeder assembly. The feeder assembly is rotated freely in response to a rotational force. The feeder assembly is freely rotatable independent of the hanger when the swivel body is in the swivel position.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for suspending a bird feeder. In one aspect, a bird feeder includes a feeder assembly connected to a finial assembly. The feeder assembly includes a top, such as a lid, cap, or ant moat, releasably connected to a reservoir for holding bird food. The finial assembly includes a finial connected to the top and a swivel connected to a hanger. The finial is translationally connected to the swivel, with the swivel translatable towards and away from the top along the finial.

When the bird feeder is lifted off a surface using the hanger, a suspending force is applied to the hanger in a direction opposite to the force of gravity. The suspending force causes the swivel to translate proximally along the finial away from the top into a swivel position. While the bird feeder is suspended with the hanger from a hanging structure, such as a tree limb, pole, beam, hook, or other structure, the swivel remains in the swivel position. In this position, the feeder assembly freely rotates independent of the hanger. More particularly, in one aspect, an entirety of the feeder assembly rotates together as a single unit relative to and without resistance from the hanger or other component. Because the rotation is unrestricted and the top is rotating in harmony with the remainder of the feeder assembly, there are no forces applied to the bird feeder that would cause the top to detach from the reservoir.

In an absence of the suspending force, the swivel translates distally towards the top into a locked position. More particularly, when the bird feeder is positioned on a surface with the application of the suspending force removed from the hanger, the force of gravity translates the swivel into the locked position. In this position, the swivel is releasably engaged to the top, such that rotation of the hanger and thus the swivel causes the top to rotate in conjunction with the hanger, facilitating disengagement of the top from the reservoir. More particularly, in the locked position, rotation of the hanger is tied to rotation of the top, such that the hanger may be used to unscrew the top from the reservoir. As such, among other benefits, the presently disclosed technology provides independent rotation of a hanger and a feeder assembly in a swivel position, preventing the top from disengaging from the reservoir, and harmonized rotation of the hanger and the top relative to the feeder assembly in a locked position, facilitating disengagement of the top from the reservoir.

Figure 1:
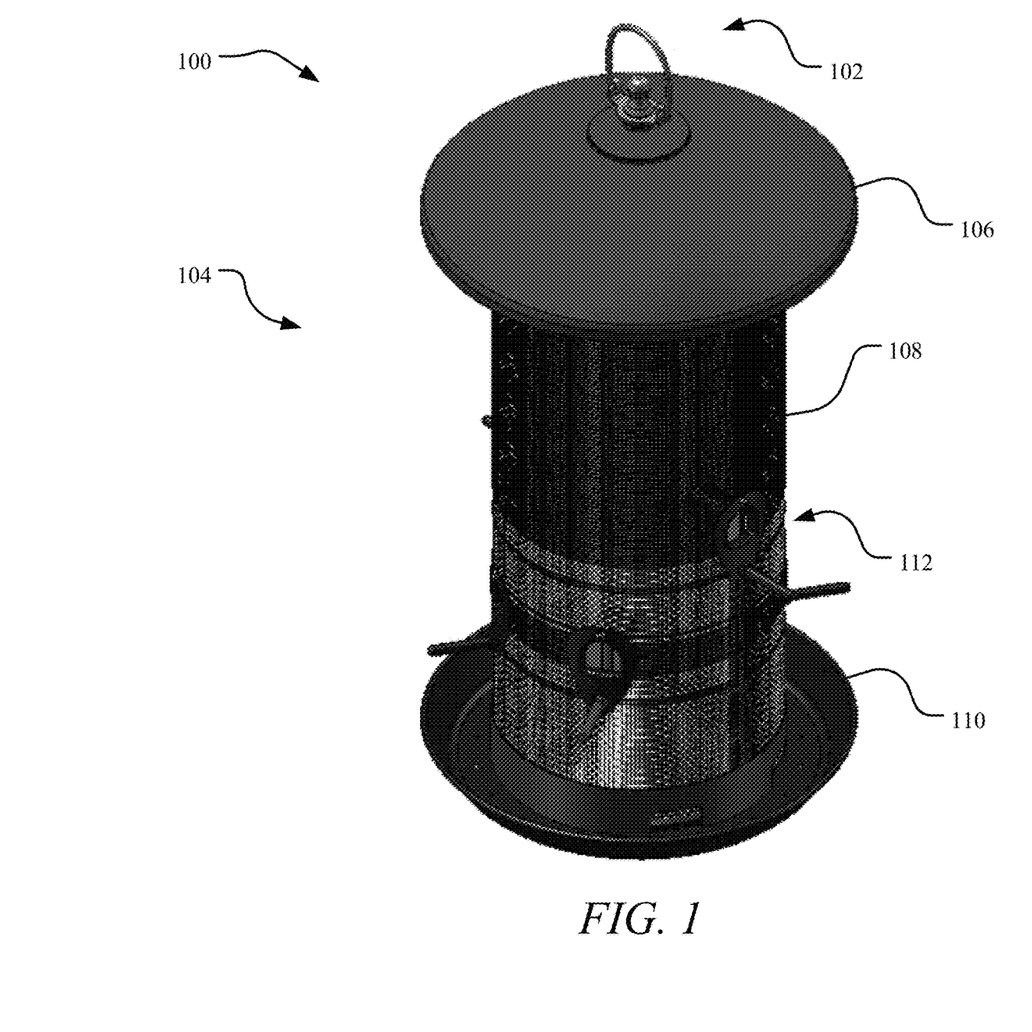
FIG. 1 illustrates an isometric view of an example bird feeder with a finial assembly.

To begin a detailed description of a bird feeder 100 having an example finial assembly 102, reference is made to FIG. 1. In one implementation, the bird feeder 100 includes a feeder assembly 104 having a reservoir 108 connected to a top 106 and a base 110. The reservoir 108 includes an interior adapted to hold bird food, such as seed, nuts, nectar, and/or the like. In one implementation, the top 106 is a lid, cap, or other structure adapted to cover an opening into the interior of the reservoir 108. In another implementation, the top 106 is an ant moat or similar structure connected to the reservoir in a releasably or fixed engagement. The feeder assembly 104 includes one or more feeding stations 112 disposed along the reservoir 108, in the base 110, and/or the like through which birds may access the bird food dispensed from the interior of the reservoir 108.

Figure 2:
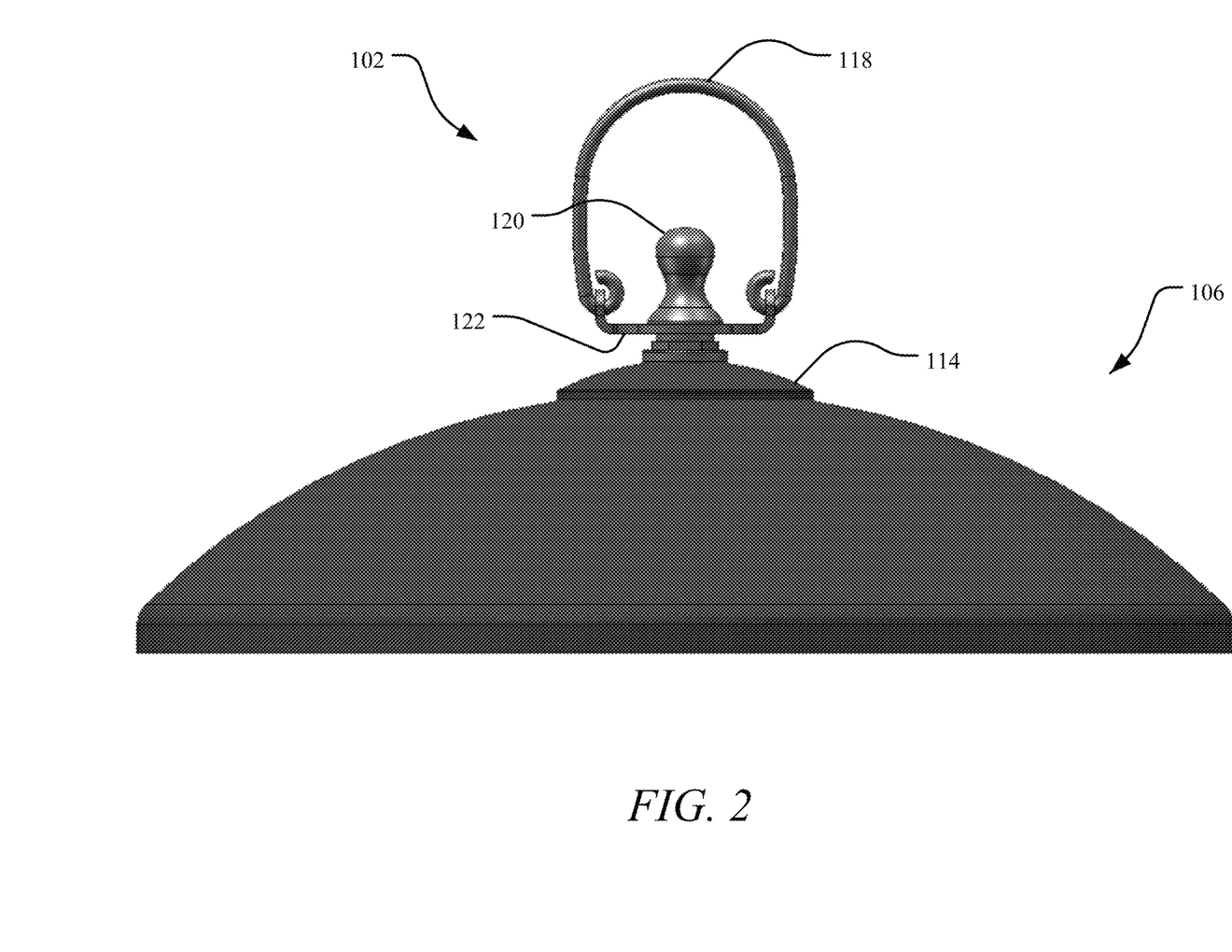
FIG. 2 shows a side view of an example finial assembly connected to a top.
Figure 3:
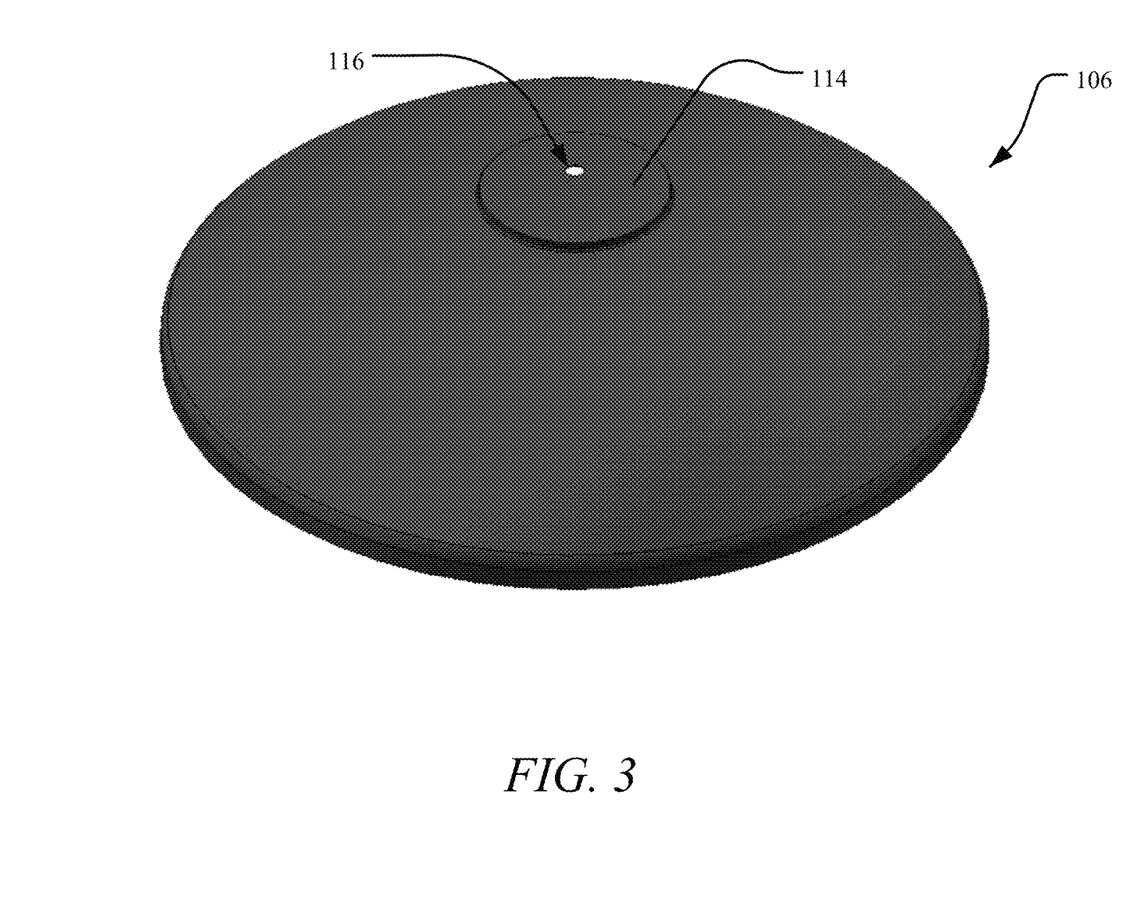
FIG. 3 depicts a top perspective view of an example top.

Turning to FIGS. 2 and 3, in one implementation, the top 106 of the feeder assembly 104 includes a surface 114 at which the finial assembly 102 is connected. An entirety of the finial assembly 102 may be disposed outside the interior of the feeder assembly 104. For example, a distal surface of the finial assembly 102 may be positioned on the surface 114 outside the interior of the feeder assembly 104. Alternatively, a portion of the finial assembly 102 may extend into or otherwise be disposed in the interior of the feeder assembly 104 via a top opening 116 in the surface 114.

In one implementation, the finial assembly 102 includes a hanger 118, a finial 120, and a swivel 122. The hanger 118 is connected to the swivel 122. For example, the hanger 118 and the swivel 122 may be one integrated piece, separate pieces fixed to each other, separate pieces releasably engaged to each other, and/or the like. In one implementation, the hanger 118 is pivotably engaged to the swivel 122, such that the hanger 118 is pivotable relative to the swivel 122 between a folded position and an upright position.

The finial 120 is connected to the top 106 and translationally engaged to the swivel 122. In this translational engagement, the swivel 122 is translatable towards and away from the surface 114 of the top 106 along the finial 120. In the presence of a suspending force, the swivel 122 translates proximally along the finial 120 away from the surface 114 into a swivel position. In this position, the feeder assembly 104 freely rotates independent of the hanger 118. In one implementation, while the swivel 122 is in the swivel position, an entirety of the feeder assembly 104, including the top 106, the reservoir 108, and the base 110, rotates together in harmony as a single unit relative to and without resistance from the hanger 118.

In an absence of the suspending force, the swivel 122 translates distally towards the surface 114 into a locked position. In this position, the swivel 122 is releasably engaged to the top 106, such that rotation of the hanger 118 causes the swivel 122 and the top 106 to rotate relative to the reservoir 108, facilitating disengagement of the top 106 from the reservoir 108. More particularly, in the locked position, rotation of the hanger 118 is tied to rotation of the top 106, such that the hanger 118 may be used to unscrew the top 106 from the reservoir 108.

Figure 4:
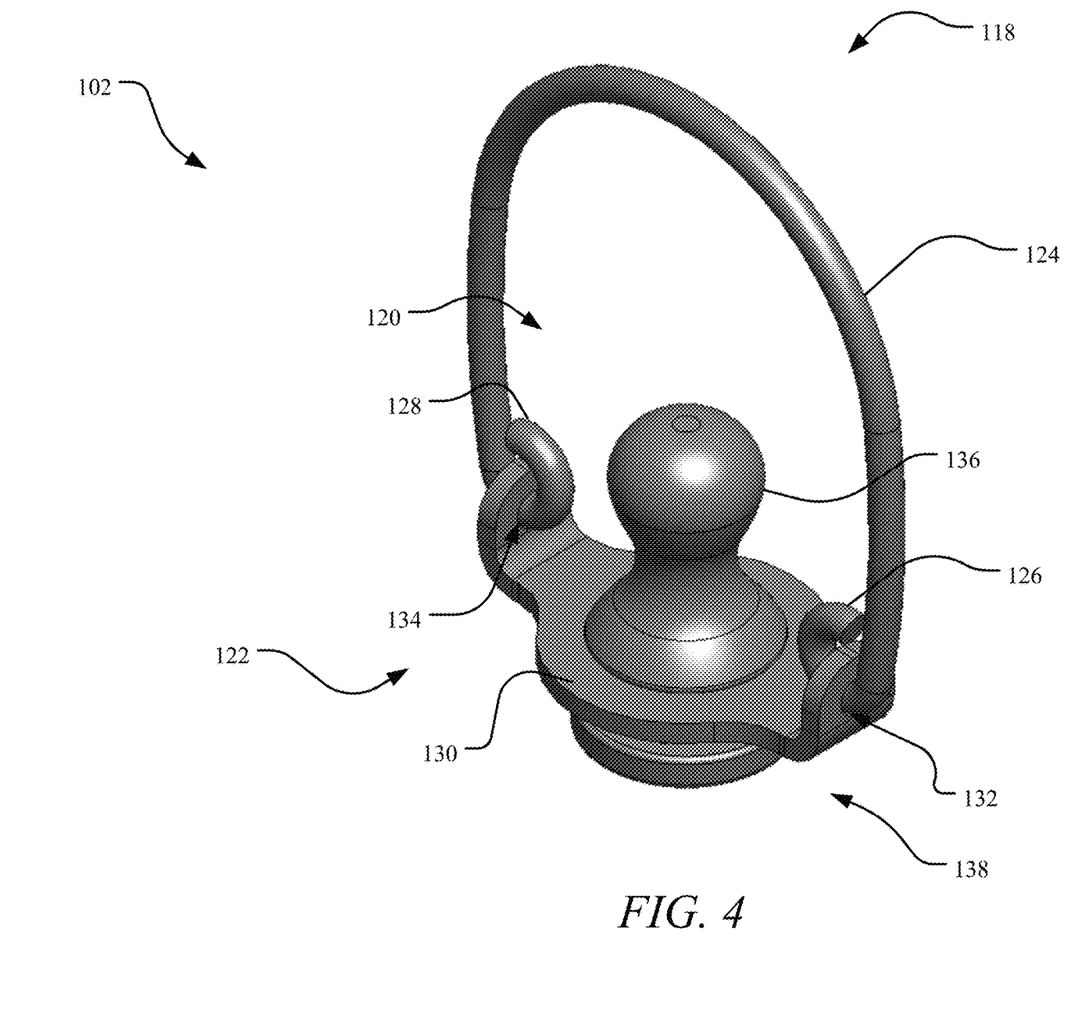
FIG. 4 is an isometric view of an example finial assembly.
Figure 5A:
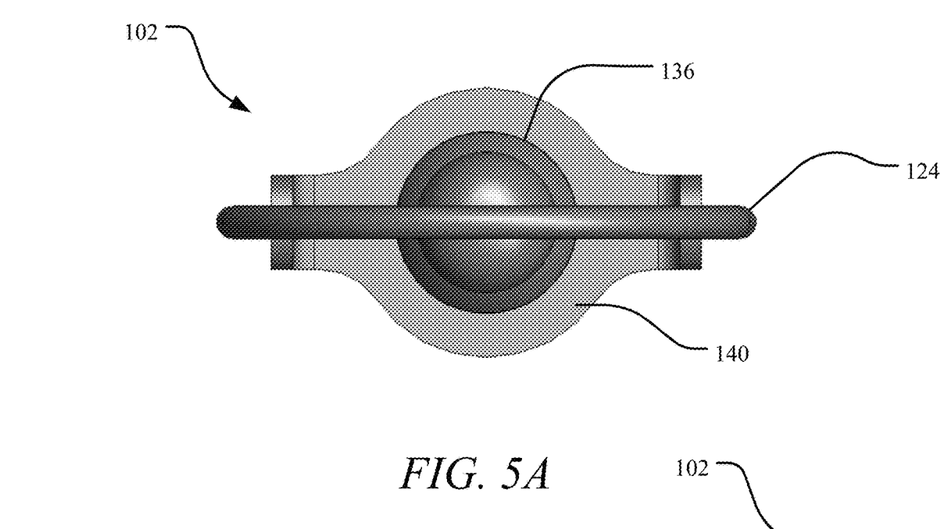
FIGS. 5A and 5B show top and bottom views, respectively, of the finial assembly.
Figure 5B:
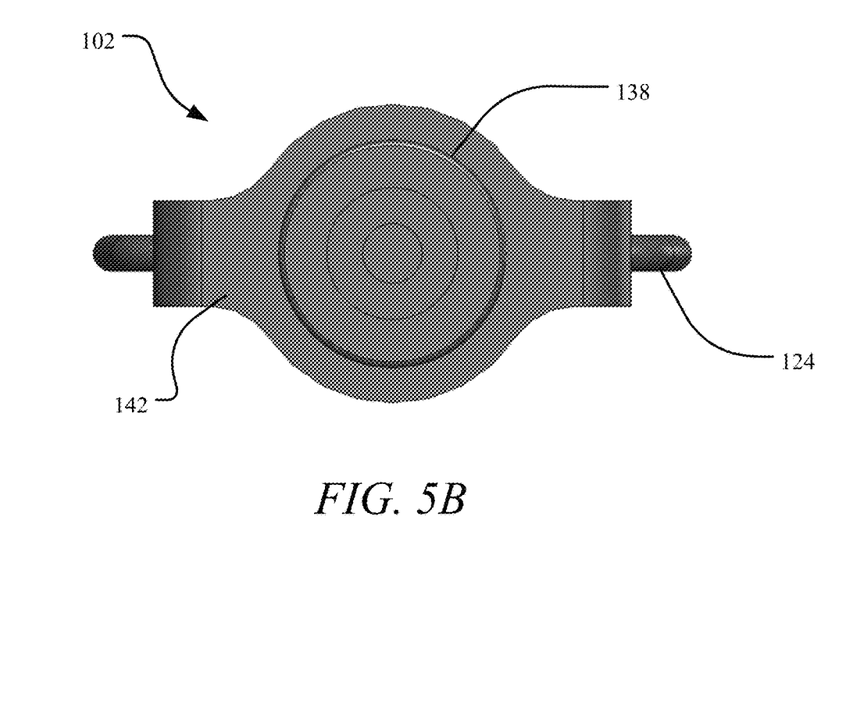
Figure 6:
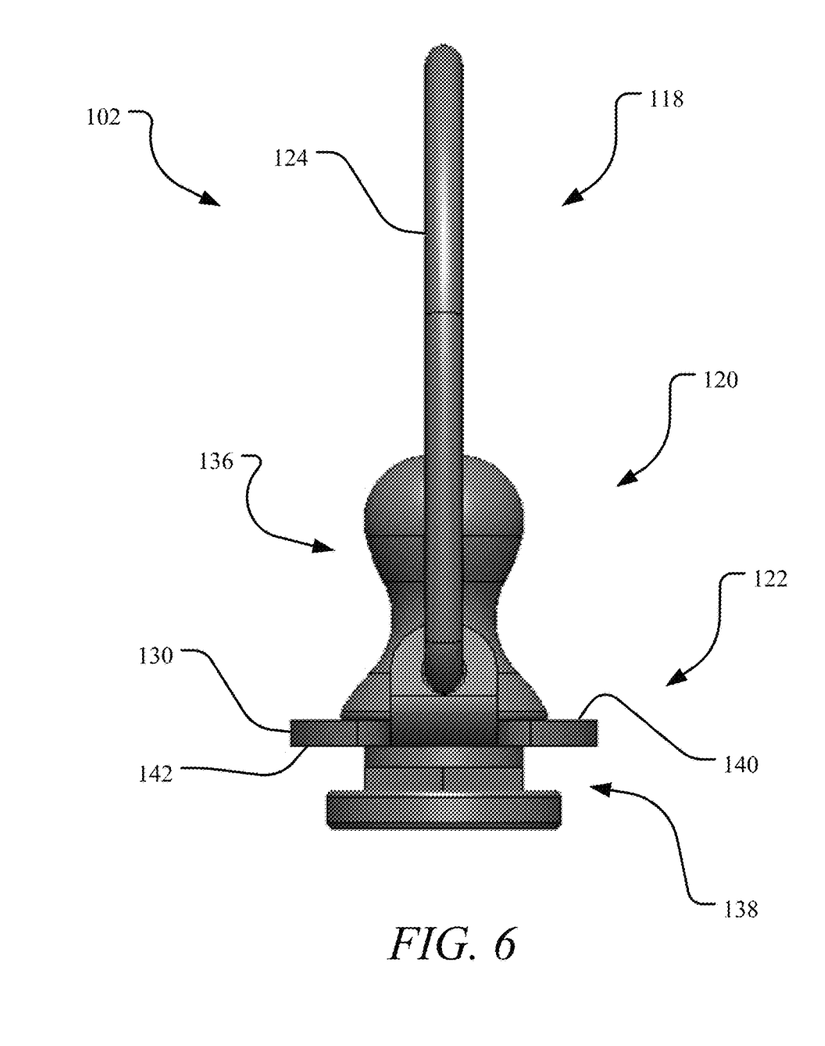
FIG. 6 illustrates a side view of the finial assembly.

Referring to FIGS. 4-6, in one implementation, the hanger 118 includes a hanger body 124 extending between a first connector 126 and a second connector 128. The swivel 122 includes a swivel body 130 having a proximal surface 140 and a distal surface 142. The hanger 118 is connected to the swivel body 130. In one implementation, the swivel body 130 includes a first receiver 132 and a second receiver 134 configured to connect with the first connector 126 and the second connector 128, respectively. For example, the receivers 132 and 134 may each include an opening through which the corresponding connector 126 or 128 extends. In one implementation, the hanger 118 is connected to the swivel body 130, such that the hanger body 124 is pivotable relative to the swivel body 130 between a folded position and an upright position. In another implementation, the hanger body 124 is fixed relative to the swivel body 130. It will be appreciated that the hanger 118 may be connected to or integral with the swivel 122 in a variety of manners.

In one implementation, the finial 120 includes a proximal portion 136 and a distal portion 138, and the swivel body 130 is translationally engaged to the distal portion 138 of the finial 120. More particularly, turning to FIGS. 7-8, in one implementation, the finial assembly 102 has a longitudinal axis 144 extending through a hanging portion of the hanger body 124, the swivel body 130, the proximal portion 136, and the distal portion 138.

Figure 7:
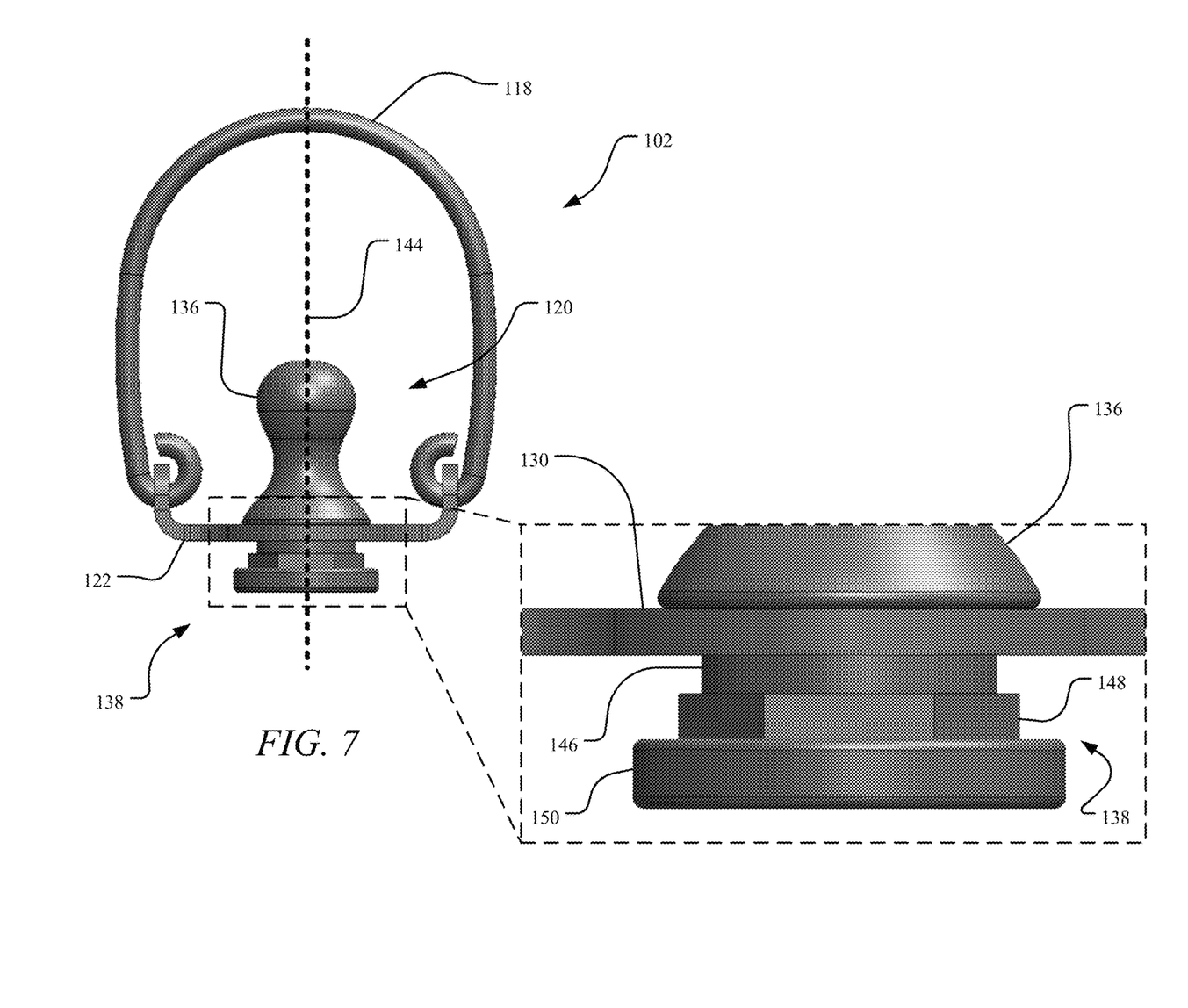
FIG. 7 is a front view of the finial assembly showing a detailed view of a distal portion of the finial assembly.
Figure 8:
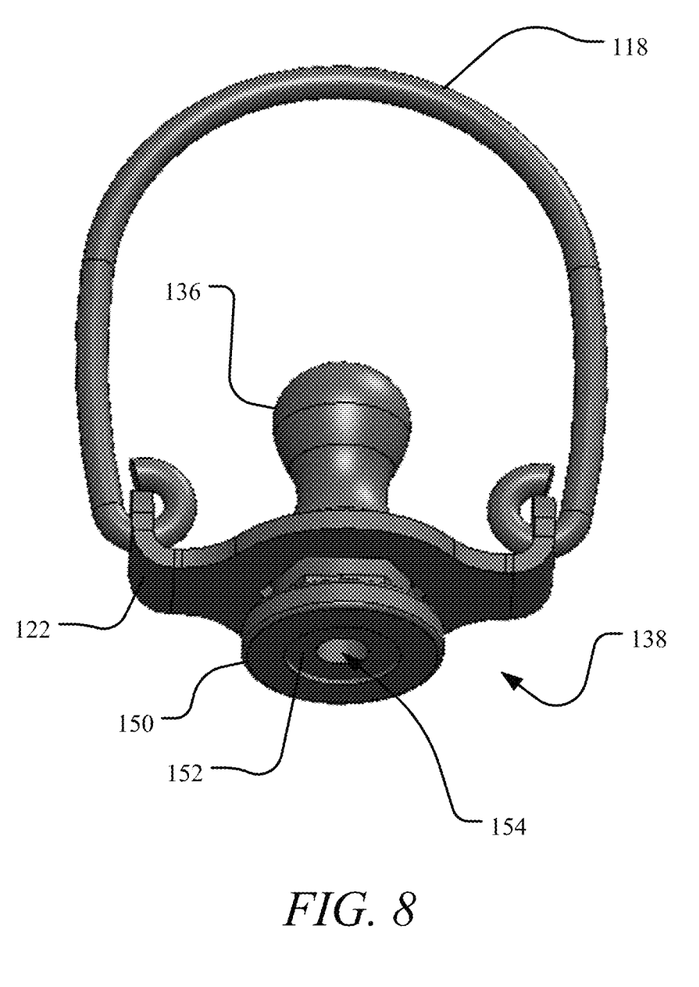
FIG. 8 depicts a bottom perspective view of the finial assembly.

In one implementation, the proximal portion 136 includes a finial body, and the distal portion 138 includes a neck 146 extending distally from the finial body of the proximal portion 136. The distal portion 138 may further include a locker 148 disposed between the neck 146 and a retainer 150. One or more of the neck 146, the locker 148, and the retainer 150 may be removable from the finial 120. In one implementation, the distal portion 138 includes a finial opening 154 defined in a distal surface 152 of the finial 120. The finial opening 154 may be aligned with the top opening 116, such that the longitudinal axis 144 is centered on the top opening 116.

Figure 9:
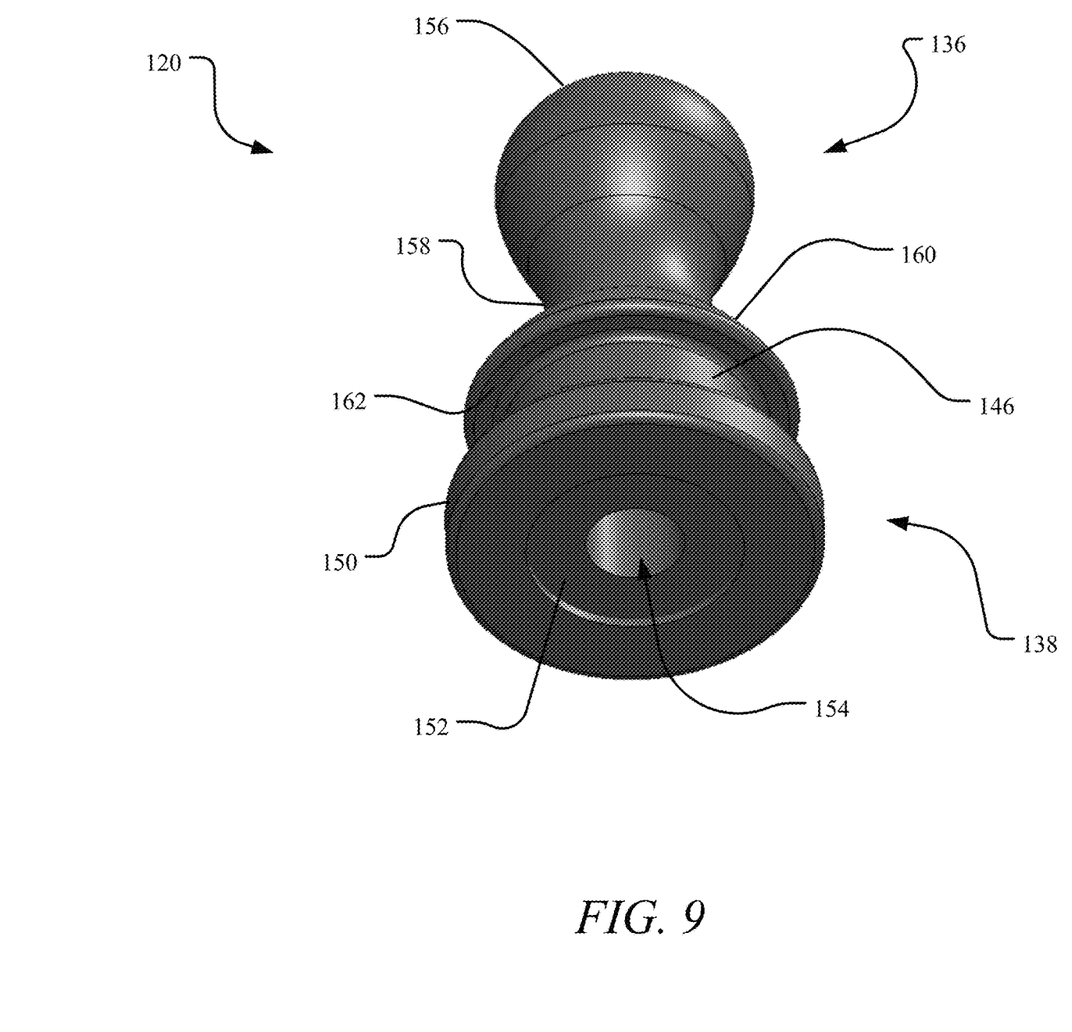
FIG. 9 shows a bottom perspective view of an example finial.
Figure 10:
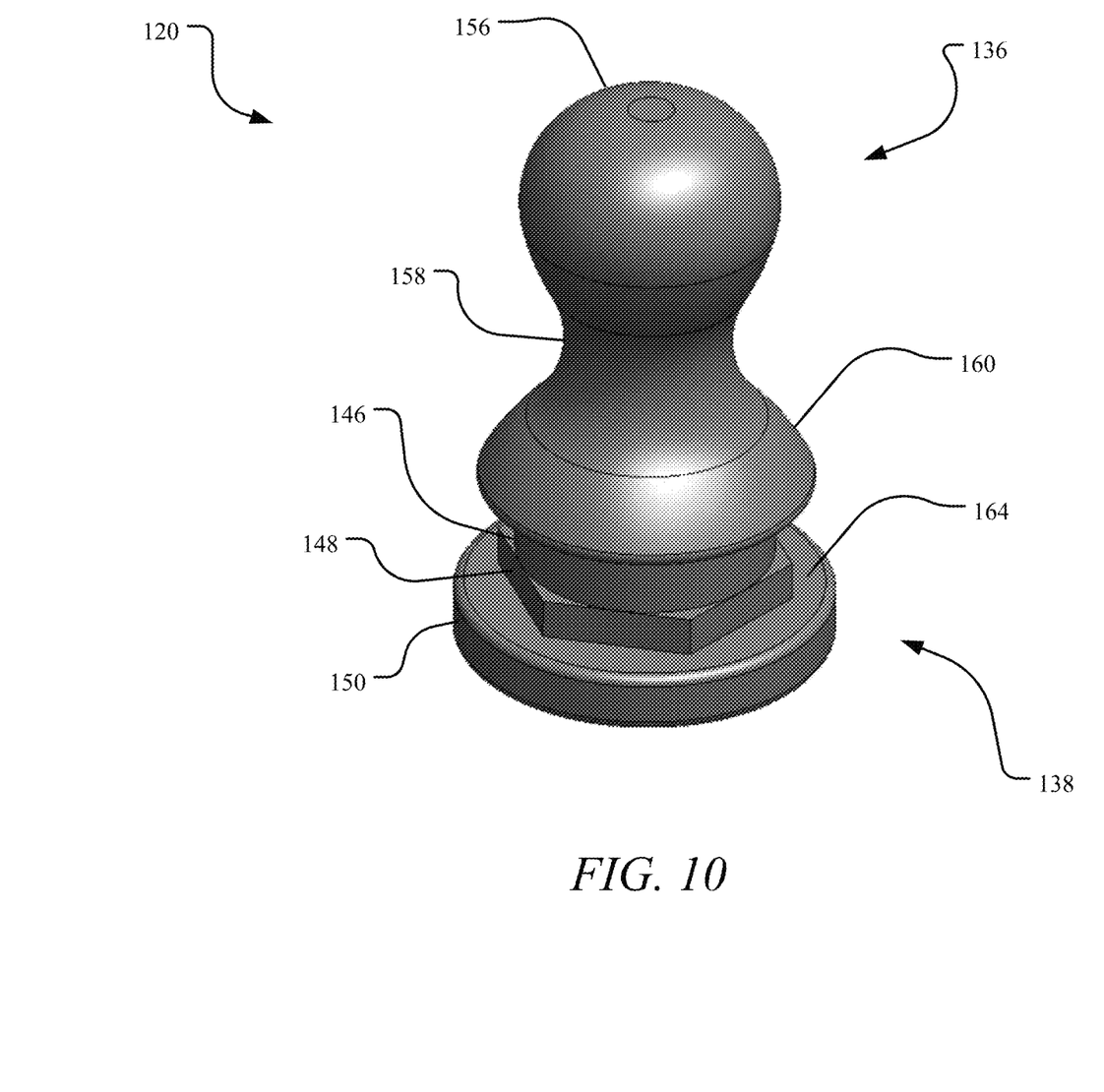
FIG. 10 illustrates a top perspective view of the finial.
Figure 11:
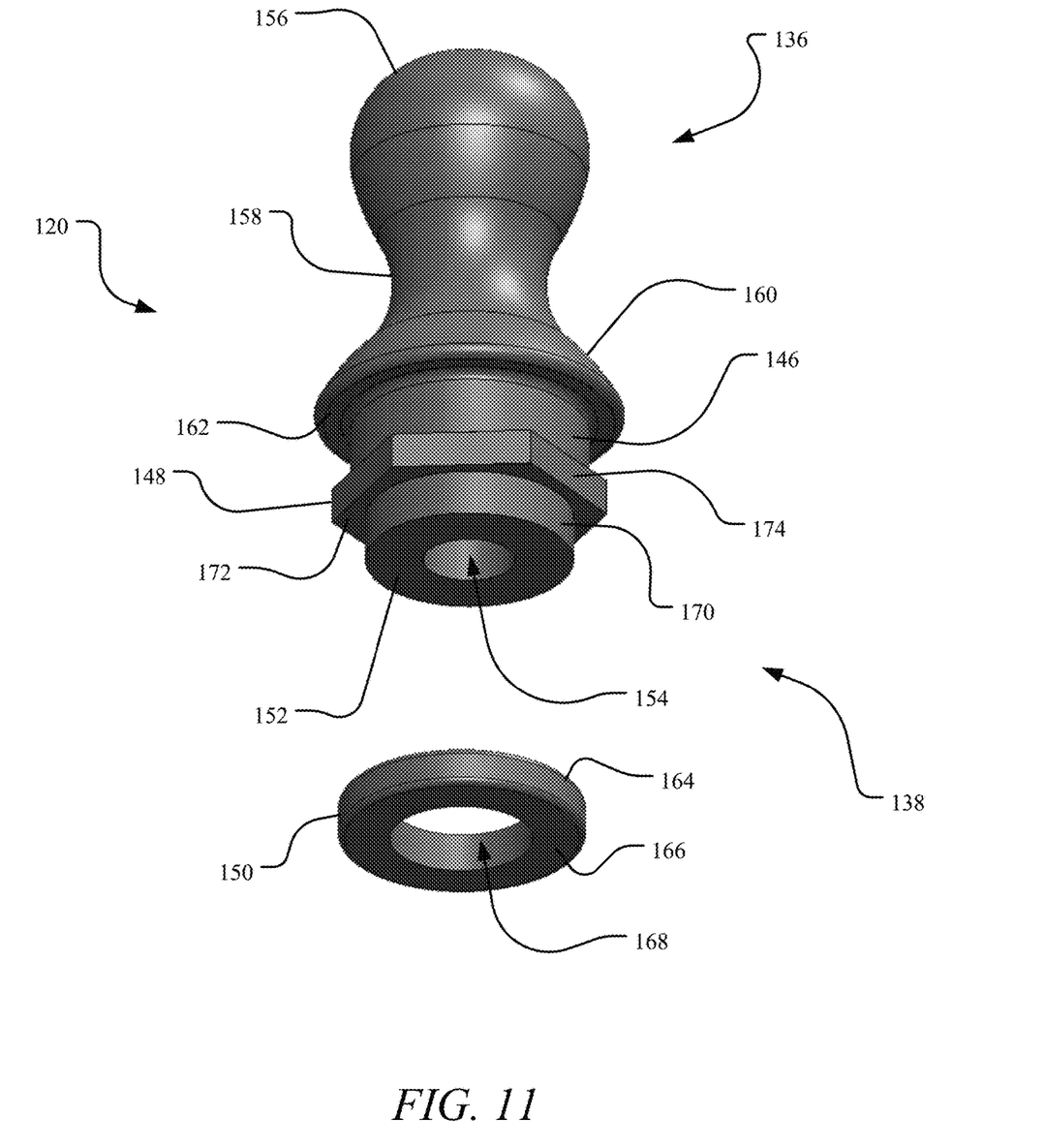
FIG. 11 shows an exploded view of the finial.

As can be understood from FIGS. 9-11, in one implementation, a first swivel surface 162 is disposed on the proximal portion 136 of the finial 120. The proximal portion 136 of the finial 120 may include a finial body. In one implementation, the finial body includes a proximal section 156 connected to a distal section 160 by a tapered section 158. It will be appreciated, however, that the finial body may have a variety of shapes, sizes, decorative features, and/or the like. In one implementation, the first swivel surface 162 is disposed on an underside of the distal section 160. The first swivel surface 162 extends radially outwards from the neck 146. The first swivel surface 162 may further extend transverse to the longitudinal axis 144. In one implementation, the first swivel surface 162 is disposed on a lip of the finial body.

In one implementation, a second swivel surface 164 is disposed on the distal portion 138 of the finial 120. For example, the second swivel surface 164 may be disposed on the retainer 150 facing the first swivel surface 162 and extending transverse to the longitudinal axis 144. The swivel body 130 is translatable between the first swivel surface 162 and the second swivel surface 164 along the longitudinal axis 144.

In one implementation, the locker 148 includes and retainer surface 172 and one or more locking surfaces 174. A retaining body 170 extends distally from the retainer surface 172 to the distal surface 152. In one implementation, the retainer 150 includes a retainer opening 168 extending between the second swivel surface 164 and a distal retainer surface 166. The retaining body 170 is received into the retainer opening 168, with the retainer surface 172 meeting and positioned on a portion of the second swivel surface 172. When engaged in this manner, the one or more locking surfaces 174 are positioned adjacent to and extending proximally from the second swivel surface 172.

Figure 12:
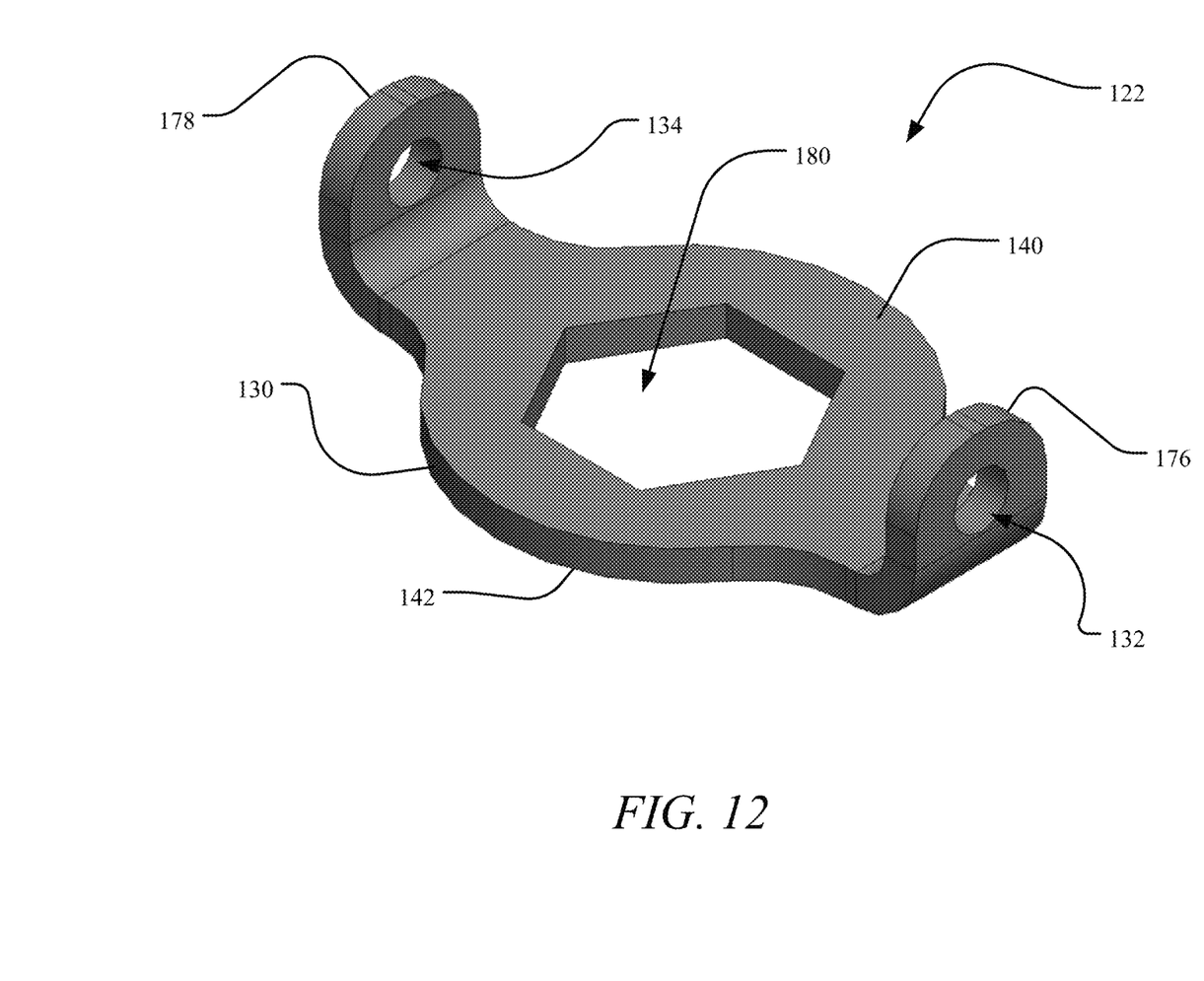
FIG. 12 is an isometric view of an example swivel.
Figure 13:
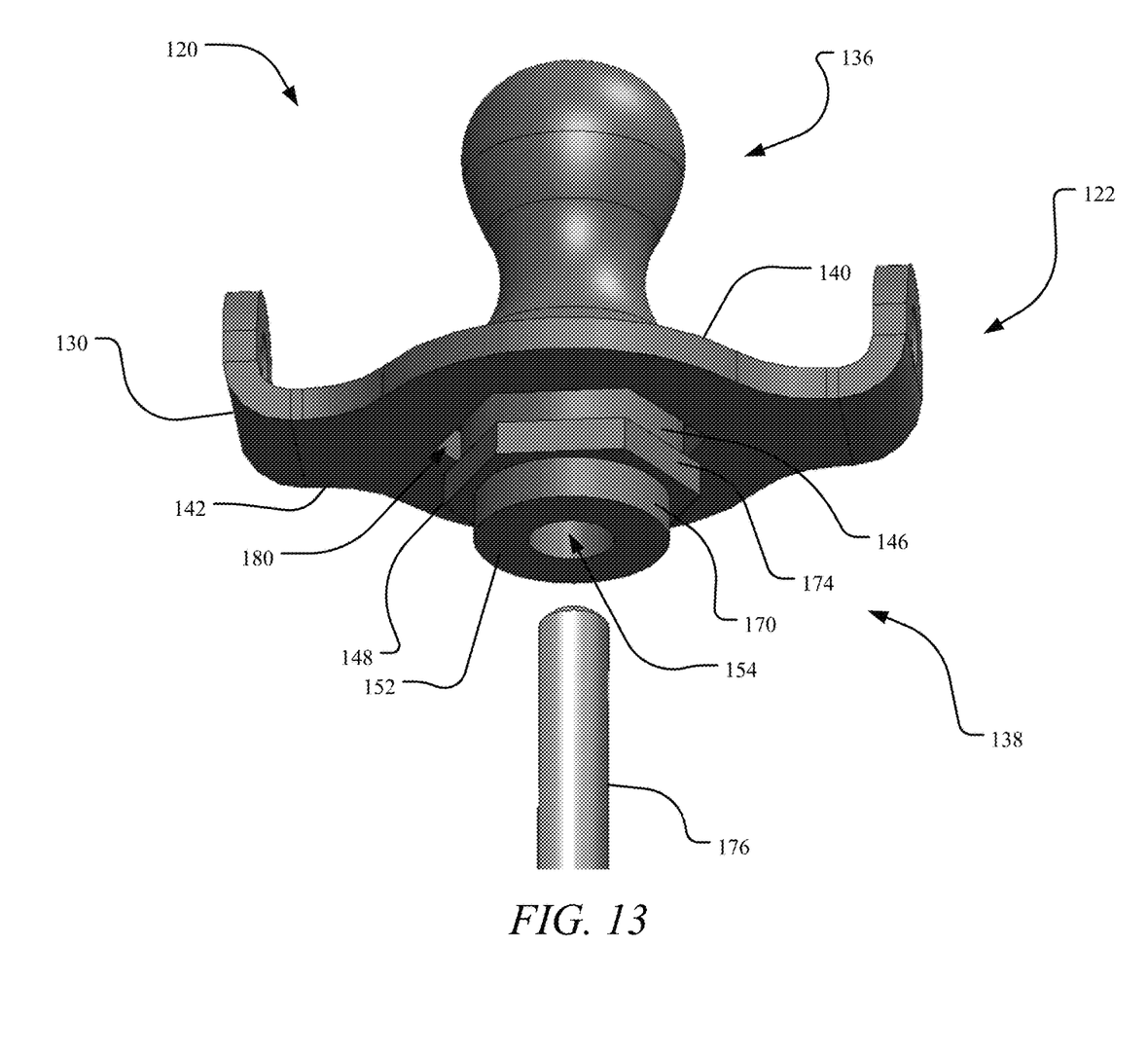
FIG. 13 illustrates a bottom perspective view of the swivel mounted to the finial.

Turning to FIGS. 12-13, in one implementation, the swivel 122 includes a first wing 176 and a second wing 178 having the first receiver 132 and the second receiver 134, respectively. The wings 176 and 178 may each curve proximally from the proximal surface 140 of the swivel body 130. However, other configurations are contemplated. Further, in one implementation, the swivel body 130 includes a swivel opening 180 extending between the proximal surface 140 and the distal surface 142.

As described herein, the swivel body 130 translates along the longitudinal axis 144 between the swivel position and the locked position. In one implementation, the swivel position includes the proximal surface 140 of the swivel body 130 contacting or otherwise disposed adjacent to the first swivel surface 162. In this position, the neck 146 is recessed from the edge defined by the swivel opening 180 forming a gap therebetween and permitting the finial 120 and thus the feeder assembly 104 to rotate freely about the longitudinal axis 144 independent of the swivel 122 and hanger 118.

In one implementation, the locked position includes the distal surface 142 of the swivel body 130 contacting or otherwise disposed adjacent to the second swivel surface 164. In this position, the locker 148 is positioned within the swivel opening 180 with the one or more locking surfaces 174 contacting and frictionally engaging corresponding surfaces formed by the edge defined by the swivel opening 180. With this frictional engagement, a rotational force applied to the handle 118 translates to the locker 148, causing the finial 120 and therefore the top 106 to rotate. With a countered force applied to the reservoir 108, the top 106 is unscrewed and disengaged from the reservoir 108 using the hanger 118. As such, the locking position facilitates disengagement of the top 106 from the reservoir 108.

In one implementation, the feeder assembly 104 includes a rod 176 or similar structure insertable into the finial opening 154 to engage the finial 120 to one or more portions of the feeder assembly 104, such as the top 106. It will be appreciated that other engagements, releasable or fixed, are contemplated.

Based upon design preferences, it is understood that the specific order or hierarchy of steps in the methods described herein can be rearranged while remaining within the disclosed subject matter. Any accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A bird feeder comprising:
    a feeder assembly having a top;
    a top opening defined in a surface of the top;
    a finial having a proximal portion and a distal portion, the finial having a longitudinal axis centered on the top opening;
    a first swivel surface disposed on the proximal portion, the first swivel surface extending transverse to the longitudinal axis;
    a second swivel surface disposed on the distal portion, the second swivel surface extending transverse to the longitudinal axis and facing the first swivel surface;
    a swivel having a swivel body translatable between the first swivel surface and the second swivel surface along the longitudinal axis; and
    a hanger connected to the swivel body, the swivel body translating towards the first swivel surface into a swivel position when a suspending force is applied to the hanger, the feeder assembly freely rotatable about the longitudinal axis independent of the hanger when the swivel body is in the swivel position, the swivel body translating towards the second swivel surface into a locked position in an absence of the suspending force.

2. The bird feeder of claim 1, wherein an entirety of the finial, the swivel, and the hanger are disposed outside the feeder assembly.

3. The bird feeder of claim 1, wherein the first swivel surface is disposed on a lip of a finial body of the proximal portion.

4. The bird feeder of claim 1, wherein the second swivel surface is disposed on a retainer of the distal portion.

5. The bird feeder of claim 4, wherein the retainer is removable.

6. The bird feeder of claim 1, wherein the locked position includes a locker of the distal portion disposed in an opening of the swivel body.

7. The bird feeder of claim 1, wherein the distal portion includes a finial opening aligned with the top opening and the feeder assembly includes a rod extending through the top opening into the finial opening.

8. The bird feeder of claim 1, wherein the distal portion is removably mounted to the top.

9. The bird feeder of claim 1, wherein the distal portion is mounted to the top with a rod.

10. The bird feeder of claim 1, wherein a distal surface of the distal portion is positioned on the surface of the top.

11. A bird feeder comprising:
- a finial having a finial body, the finial having a longitudinal axis;
- a swivel surface disposed on the finial body;
- a neck extending distally from the finial body along the longitudinal axis;
- a swivel having a swivel body with a proximal surface and a distal surface;
- a swivel opening defined in the swivel body, the neck extending through the swivel opening, the swivel body translatable along the neck; and
- a hanger connected to the swivel body, the swivel body translating along the neck towards the swivel surface into a swivel position when a suspending force is applied to the hanger, the finial freely rotatable about the longitudinal axis independent of the hanger when the swivel body is in the swivel position, the swivel body translating along the neck into a locked position in an absence of the suspending force.

12. The bird feeder of claim 11, wherein the hanger is connected to the swivel body with a set of paired connectors and receivers.

13. The bird feeder of claim 11, wherein the swivel surface meets the proximal surface of the swivel body in the swivel position.

14. The bird feeder of claim 11, wherein a locker extends from the neck, the locker having at least one locking surface engageable to the swivel body in the swivel opening in the locked position.

15. A method comprising:

receiving an application of a suspending force on a hanger connected to a swivel, the swivel having a swivel body with a proximal surface and a distal surface;

translating the swivel body along a neck of a finial upon the application of the suspending force, the swivel body translated towards a first swivel surface of the finial into a swivel position, the finial connected to a feeder assembly of a bird feeder;

rotating the feeder assembly freely in response to a rotational force, the feeder assembly freely rotatable independent of the hanger when the swivel body is in the swivel position;

releasing the application of the suspending force on the hanger; and translating the swivel body along the neck of the finial upon the release of the application of the suspending force, the swivel body translated away from the first swivel surface towards a second swivel surface into a locked position.

16. The method of claim 15, further comprising:

releasing a top from a reservoir of the feeder assembly when the swivel body is in the locked position.

17. The method of claim 15, wherein the locked position includes a locker of the finial disposed in an opening of the swivel body.

* * * * *